United States Patent [19]

Spenard

[11] Patent Number: 5,261,253
[45] Date of Patent: Nov. 16, 1993

[54] REFRIGERATED DISPLAY CABINET

[76] Inventor: Jean-Claude Spenard, 837, chemin Fresniéres, Saint-Eustache, Canada, J7R 4K3

[21] Appl. No.: 3,485

[22] Filed: Jan. 12, 1993

[51] Int. Cl.⁵ ............................................. A47F 3/022
[52] U.S. Cl. .................................... 62/250; 206/804; 220/1.5; 254/93 HP; 312/319.3; 414/796.7
[58] Field of Search ...................... 62/250; 206/804; 220/1.5; 414/495, 796.7; 254/93 HP; 312/319.3

[56] References Cited
U.S. PATENT DOCUMENTS

| | | | |
|---|---|---|---|
| 3,314,250 | 4/1967 | Weber | 62/250 X |
| 4,629,162 | 12/1986 | Porchá254 | 93 HP/ |
| 5,067,774 | 11/1991 | Trowland | 254/93 HP |

Primary Examiner—William E. Tapolcai
Attorney, Agent, or Firm—Pierre Lespérance; Francois Martineau

[57] ABSTRACT

The foodstuff-displaying refrigerator unit comprises a box-like container, having an enclosure upwardly opening through a top mouth. A door aperture is defined about a side wall of the container. A vegetable-supporting platform is freely mounted into the enclosure for vertical movement therethrough. A pallet is supported by a first conveyor, itself resting on the container flooring. Inflatable balloons are provided between the pallet and the platform, for power lifting the platform. An air compressor feeds air into the balloons, and furthermore cools the air within the container enclosure beneath the platform. The top layer of foodstuff supported by the platform can thus be adjusted by the inflatable balloons, to remain substantially about the plane of the top mouth of refrigerator enclosure, to facilitate inspection of and access to the foodstuff independently of the level of progressive attrition of foodstuff from successive foodstuff withdrawal by customers.

7 Claims, 4 Drawing Sheets

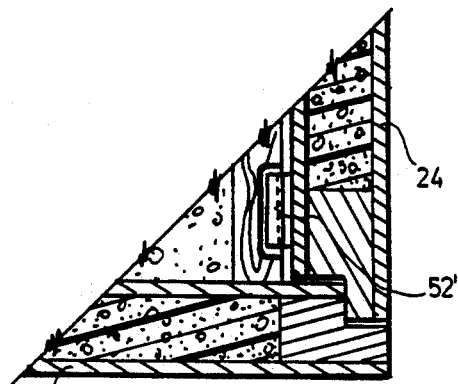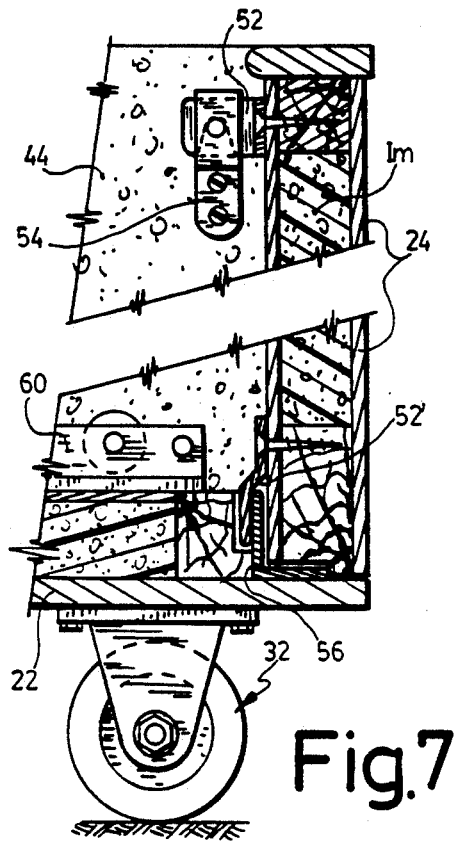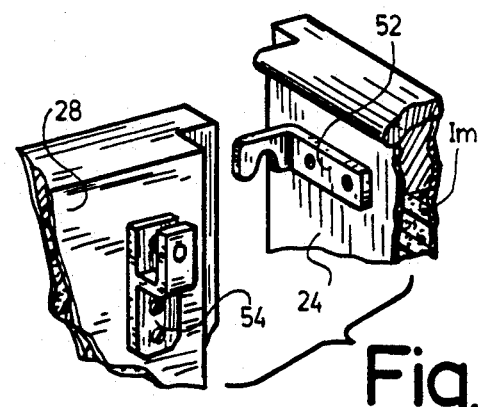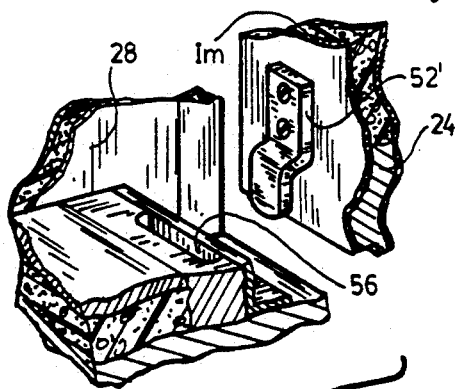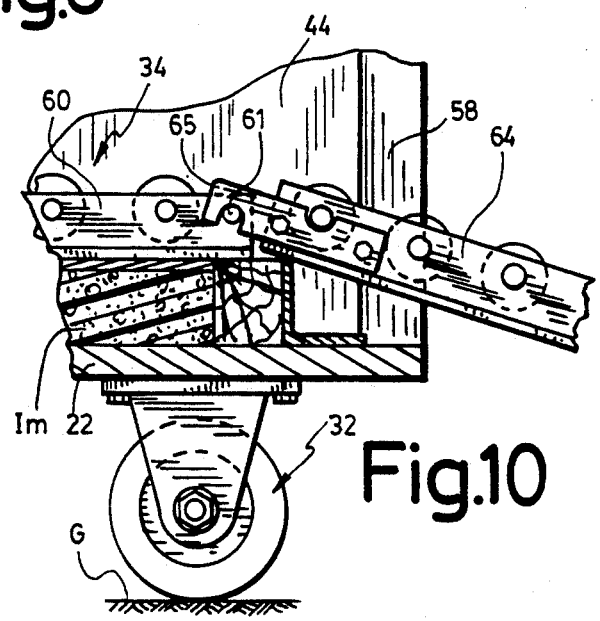

REFRIGERATED DISPLAY CABINET

FIELD OF THE INVENTION

This invention relates to commercial grade refrigerator units having display surfaces for exhibiting to foodstore customers perishable foodstuff, typically fruits and vegetables, while the same is being subjected to the cooling action of a refrigerator means.

BACKGROUND OF THE INVENTION

U.S. Pat. No. 1,664,489 issued in 1928 to the corporation: The Cincinnati butchers' supply company, discloses a refrigerator display case. This refrigerator display case is arranged to rest upon the floor of the foodstore, with a serving counter top, over which the goods are arranged to be served to the customer, while the counter top is subjected to the cooling action of a cooling means (in view of extending total preservation time of the perishable foodstuff). The counter shelves 95, 96, 97—which support foodstuff goods—are covered by window panels 25, 43, which enable viewthrough visual access of the foodstuff by the store customers, while providing containment for the cooled air refrigerated by the refrigerator elements within the enclosure defined around the counter good supporting shelves by the window panels. A variety of access doors 51 enable access to the counter top, while limiting cool air deperditions.

Among the drawbacks of this old art embodiment of refrigerator display case unit, three are readily apparent:

1) high labour costs

Indeed, in such display cases, the foodstuff need to be manually and individually loaded thereinto. Since these foodstuff goods are perishable, and often soft-bodied, care has to be exercised in their handling—hence a relatively slow loading cadence. This of course is highly inefficient.

2) accessing

The presence of access doors which need to be opened and closed to reach the foodstuff-containing enclosure, create a physical obstacle to the consumer. This obstacle does have a psychological impact on the consumer, which may be detrimental to the buying urge. Contemporary refrigerated display counters are all of the open-type, except for those counters exhibiting fully freezed goods (such as ice cream).

3) accessing (bis)

Each shelf inside the refrigerated counter enclosure will usually hold at least a few layers of vertically stacked foodstuff goods (e.g. apples). As the foodstuff on any given shelf is progressively depleted, the customer needs to reach out deeper and deeper into the display counter case to be able to grab the selected good, as the lower layers of the stacked food become the "upper" layer This will generate an increasingly uncomfortable environment to the customer, not only because the customer will be "refrigerated" in the process, but also because she will have to bend down. Such bending down may represent a physical problem for elderly and handicapped persons.

OBJECTS OF THE INVENTION

The gist of the invention is therefore to address the problems outlined in the background of the invention paragraph, by providing a refrigerated display container having means for progressively lifting the counters on which the foodstuff goods are displayed, as the upper layer of these foodstuff goods are progressively depleted therefrom, whereby the successive display layers of foodstuff remain substantially at the same horizontal level as the original top layer thereof.

A corollary object of the present invention is to provide such a refrigerated display case, which will address the needs of elderly and handicapped persons.

A general object of the invention is to provide a refrigerated display case, which will substantially reduce the labour costs associated with the loading of the perishable foodstuff into the display case.

SUMMARY OF THE INVENTION

In accordance with the objects of the invention, there is . disclosed a A foodstuff-displaying refrigerator unit for use in a grocery store, comprising in combination: (a) a container, having a peripheral side wall member and a bottom flooring, whereby an enclosure is defined, said enclosure upwardly opening through a top mouth; (b) a platform, freely engaged into said enclosure for vertical movement therethrough along said side wall member, said platform defining an overlying loading volume for supporting and circumscribing perishable foodstuff goods in vertically stacked layers; (c) means for power lifting said platform from a lower limit position, proximate said flooring, to an upper limit position, proximate said mouth, said lifting means including an inflatable balloon member, directly engaging the underface of said platform and supported by said flooring, air feed means, for feeding pressurized air into said balloon member for inflating the latter, and control means, for actuating said air feed means upon said foodstuff goods in said platform loading volume becoming at least partially depleted; (d) cooling means, for continuously cooling the air within said foodstuff loading volume; wherein the level of top layer of said foodstuff goods within said loading volume is adjusted by said control means to remain substantially about the plane of said top mouth of refrigerator enclosure, upon progressive depletion of foodstuff goods due to the picking up of the foodstuff goods by the grocery store customers, so as to maintain ease of inspection of and of access to the foodstuff by the customer.

BRIEF DESCRIPTION OF THE DRAWINGS

FIG. 6 is an enlarged view of the area circumscribed by circle 6 in FIG. 4;

FIG. 7 is a partly broken sectional view of the fruit display container, from a perspective at right angle relative to the perspective of FIG. 5, and showing the access door in its closed condition;

FIGS. 8 and 9 are exploded, partial, perspective views of the latch members from the access door of the fruit display container;

FIG. 10 is a view similar to FIG. 7, but with the access door being opened and showing the upper conveyor being extended outwardly from the container, for loading a fruit crate-supporting pallet; and FIG. 11 is an enlarged view of the overpressure release mechanism for the platform elevating inflatable balloons.

DETAILED DESCRIPTION OF THE INVENTION

Figure 1:
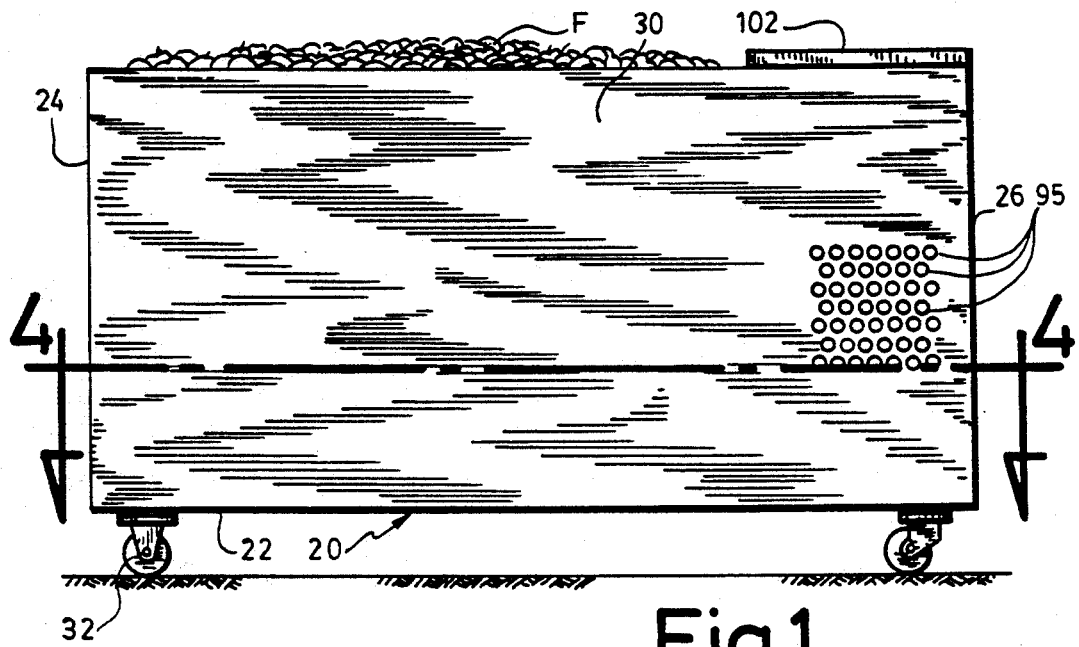
FIGS. 1 and 2 are lateral and end elevations respectively of a ground movable fruit container of the invention.
Figure 2:
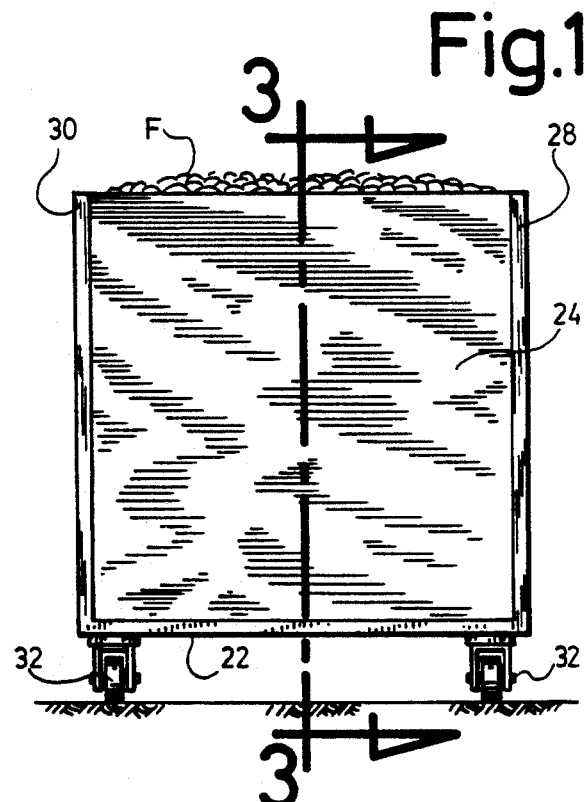

The fruit display container 20 includes a flooring 22, two end side walls 24, 26, and two lateral side walls 28, 30. Bottom wall 22 is carried over ground by idle casters 32. Container 20 defines a first, large, inner compartment, 34, for releasably receiving a fruit transport box 36, containing e.g. apples or the like perishable foodstuff goods. The box 36 defines an integral, bottom wall member or pallet, 38, proximate flooring 22 of container 20, four side walls, 40, 42, 44, 46, a top mouth 48 circumscribed by the top edges of vertical walls 40–46 and coming in approximate register with the top edge of side walls 24–30 of foodstuff container 20, and a platform 50 movable vertically within box 36. Pallet 38 defines top and bottom panels 38a, 38b, spaced by a channel C.

Side wall 24 is releasably connected to the container 20 by hook-type edgewise latches 52, 52, 52, (FIGS. 8-9) engaging corresponding latches 54, 54, 56, which are mounted edgewisely of adjacent portions of side walls 28, 30, and flooring 22, respectively. Accordingly, side wall 24 constitutes a door releasably closing a large access opening 58 (FIG. 10). Door opening 58 enables free passage of fruit box 36 for loading or unloading the latter into compartment 34 of container 20.

Figure 4:
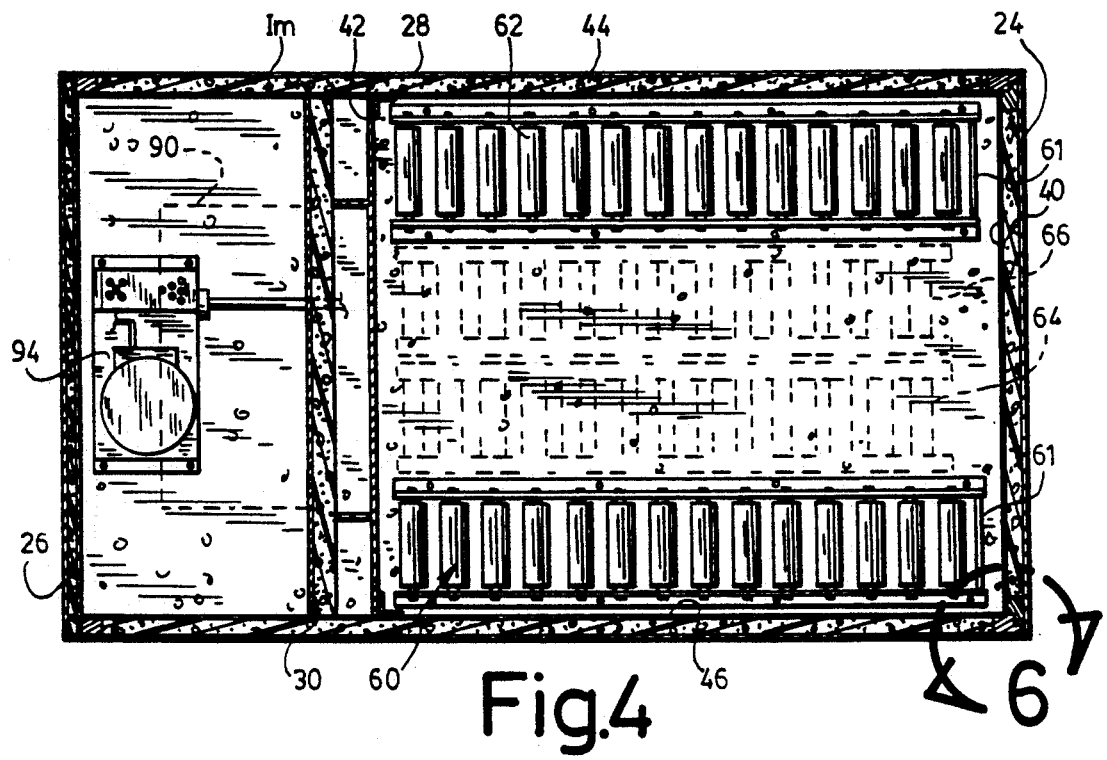
Figure 5:
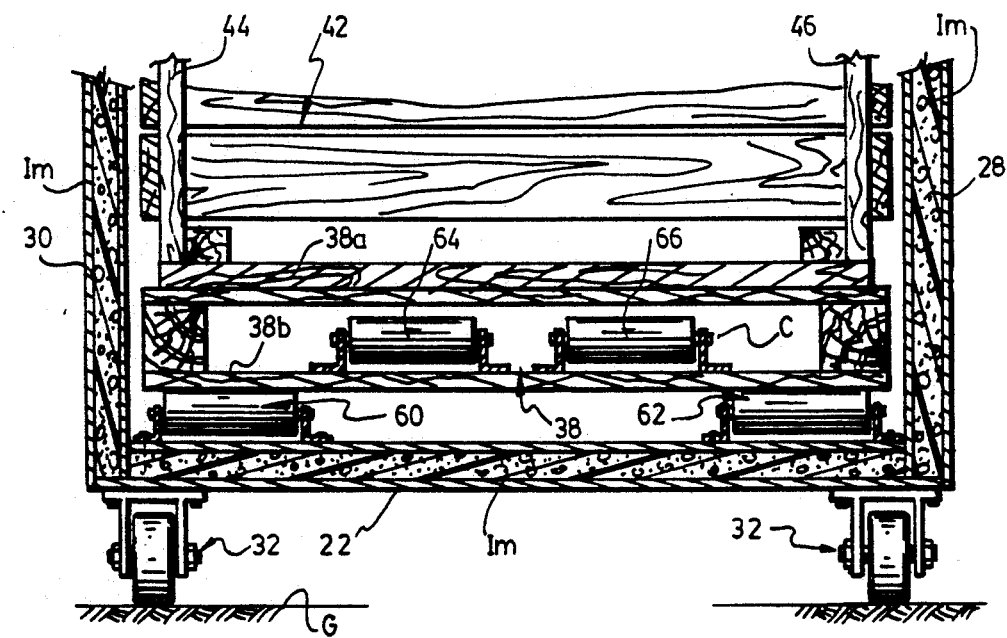
FIG. 5 is a cross-section about line 5—5 of FIG. 3.

As illustrated in FIGS. 4–5 and 10, a first pair of elongated conveyor members, 60, 62, are rotatably anchored to flooring 22 within inner compartment 34, for enabling rolling displacement of a load along parallel axes which are orthogonal to the plane of door opening 58. Conveyor members 60, 62, are anchored proximate opposite side walls 28, 30, respectively. A second set of elongated conveyor members 64, 66, similar to conveyor members 60, 62, but freely detached from flooring 22, are further provided. Each conveyor member 64, 66, further includes an inner end hook extension 65, 65; and each conveyor member 60, 62, includes an outer end transverse pivotal rod 61, 61; wherein upon extension of conveyor members 64, 66, outwardly from compartment 34, hooks 65, 65, are releasably pivotally engageable about rods 61, 61, in an operative position. In this operative position, conveyors 64, 66, constitute an inclined ramp (FIG. 10) having an outer end edge, abutting directly against ground level G, and an inner end edge (hook extensions 65, 65), in register with the top plane of anchored conveyors 60 62.

Hence, easy loading of a heavy fruit box 36 into compartment 34 can be achieved, simply by pushing box 36 along inclined conveyor ramp 64, 66 (which is temporarily integral to fixed conveyor base 60, 62), along rollingly over main conveyor base 60, 62, until the whole box 36 fits inside the inner compartment 34. After box loading, loose conveyor ramp 64, 66, is preferably (for convenience to the user) retracted through and into channel C of the pallet 38, (which forms an integral part of box 36), before door 24 is closed.

According to the invention, a pair of inflatable balloon members 68, 70, (FIG. 3) are mounted between the top wall 38a of pallet 38, and platform 50, for raising the latter relative to pallet 38. An air compressor 72, integral to container 20 but located outside inner compartment 34, feeds air to a valve 74 interconnecting the balloons 68, 70, via a flexible hose 76.

Accordingly, at the lower limit position of platform 50, balloons 68, 70, are completely flattened under the load of the platform (since they are empty of air)) and platform 50 therefore abuts flatly against pallet 38, with only the double thickness of the wall of balloons 68, 70, therebetween. The load of fruits F may then extend up to the level of top mouth 48 of compartment 34, starting from the level of pallet 38. At the upper limit position of platform 50, for example in FIG. 3, the top layer of fruits F is again about the level of mouth 48, yet the platform 50 has raised above pallet 38 under the bias of inflated balloons 68, 70, wherein the lower layer of fruits F is accordingly raised at a corresponding distance above pallet 38.

Advantageously, an overpressure relief means 80 (FIG. 11) is provided, to prevent air pressure within balloons 68, 70, from exceeding a threshold level (beyond which bursting of the balloons could undesirably occur, or, alternately, the fruits would overflow the platform and fall to the ground). Means 80 preferably consists of a hose 78, operatively connected at one end to valve 74 and at the opposite end to a spring-biased V-clamp 82, anchored to platform 50 by screw means 83 and extending within a through-bore 50a made centrally of platform 50. V-clamp 82 seals the top mouth 78a of hose 78, under the bias of its spring-biasing means 84, that is, until the air pressure inside hose 78 exceeds said threshold value, beyond which the spring bias of means 84 will progressively yield, whereby the two legs of V-clamp 82 will progressively move away from one another, thus opening up mouth 78a and enabling air to escape from hose 78, through bore 50a and over platform 50 within fruits F.

In any event, as an added safety feature, a loose chain 86 (FIG. 3) preferably interconnects valve 74 and V-clamp 82 to pallet 38, again to prevent platform 50 from reaching beyond a set upper limit position.

An air cooling means 88 is further provided, to maintain air temperature around perishable foodstuff F within a low range of temperatures (but over freezing levels), so as to extend the useful lifetime of the food. Means 88 may include an air refrigeration and ventilating unit 90, located within inner compartment 34, and a temperature sensor 92, located within compartment 34 and operatively coupled to refrigeration unit 90 via a data processing unit 94, located outside compartment 34. Preferably, refrigeration unit is located proximate flooring 22, but must be vertically offset from pallet 38. Air intake ports 95 (FIG. 1) are made into wall 30, to enable fresh air intake into refrigeration unit 90.

Preferably, for cost efficient operations, all the walls circumscribing inner compartment 34 are thermally insulated with insulating material Im. Box 36, including platform 50, will not be thermally insulated. Indeed, cool air leaking through the thickness of uninsulated platform 50 (and through bore 50a) will desirably disperse through the foodstuff F supported by platform 50, thus promoting their preservation. As clearly illustrated in FIG. 3, inner compartment 34 is of irregular shape, comprising a main chamber, for receiving the fruit box, and two smaller chambers one of which is uninsulated.

The main chamber of inner compartment 34 is defined by side wall 24, by a large fraction of each side wall 28 and 30, by most of flooring 22 and by a small fraction of side wall 26. The main chamber and two small chambers of the inner compartment 34 are further separated by U-shape partition member having partitions 100, 102, 104, and 106. Uninsulated partition and anchored at its edges to walls 28, 30 and flooring 22. Top partition 102 fixedly joins the top edge of wall 26 with a fraction of the top edges of walls 28 and 30. Insulated partition 104 is located intermediate and extends parallel to flooring 22 and top cover 102, and interconnects walls 26 and 100 and walls 28 and 30. Insulated partition 106 is located intermediate and extends parallel to wall 26 and partition 100, and interconnect side walls 28 and 30. Partition 100, a fraction of side walls 28 and 30, and door 24 all include a coextensive, horizontally-extending, inner, thermally insulating strip 110, which frictionally engage with the corresponding side walls 40–46 of fruit box 36 when door 24 is closed and locked with latches 52–56. Partition 100 is pierced with a plurality of apertures 110a, 110b, above insulating strip 110 and below insulated partition 104, respectively, to promote air circulation.

Sensor 92 is located between partitions 100 and 42, beneath insulating strip 110; and sensor 92 is connected to CPU 94 via line 93, which extends sealingly through uninsulated wall 100 and insulated partition 106. Apertures 110b lead cooled air from refrigerator unit 90, through channel C within pallet 38, for eventually seeping upwardly around balloons 68, 70, toward platform 50, and through bore 50a into foodstuff F. Since annular insulating band 110 is located exteriorly of walls 40–46 of fruit transport box 36, it does not hamper the vertical motion to platform 50, which moves on the inner sides of these walls 40–46.

Air compressor 72 may be triggered or stopped in any suitable fashion. Two such triggering means are preferred. The first one would simply be a manual knob (not shown), projecting outwardly from cover 102 and incrementally actuatable by the foodstore employee in charge of the maintenance of the perishable foodstuff department.

Figure 3:
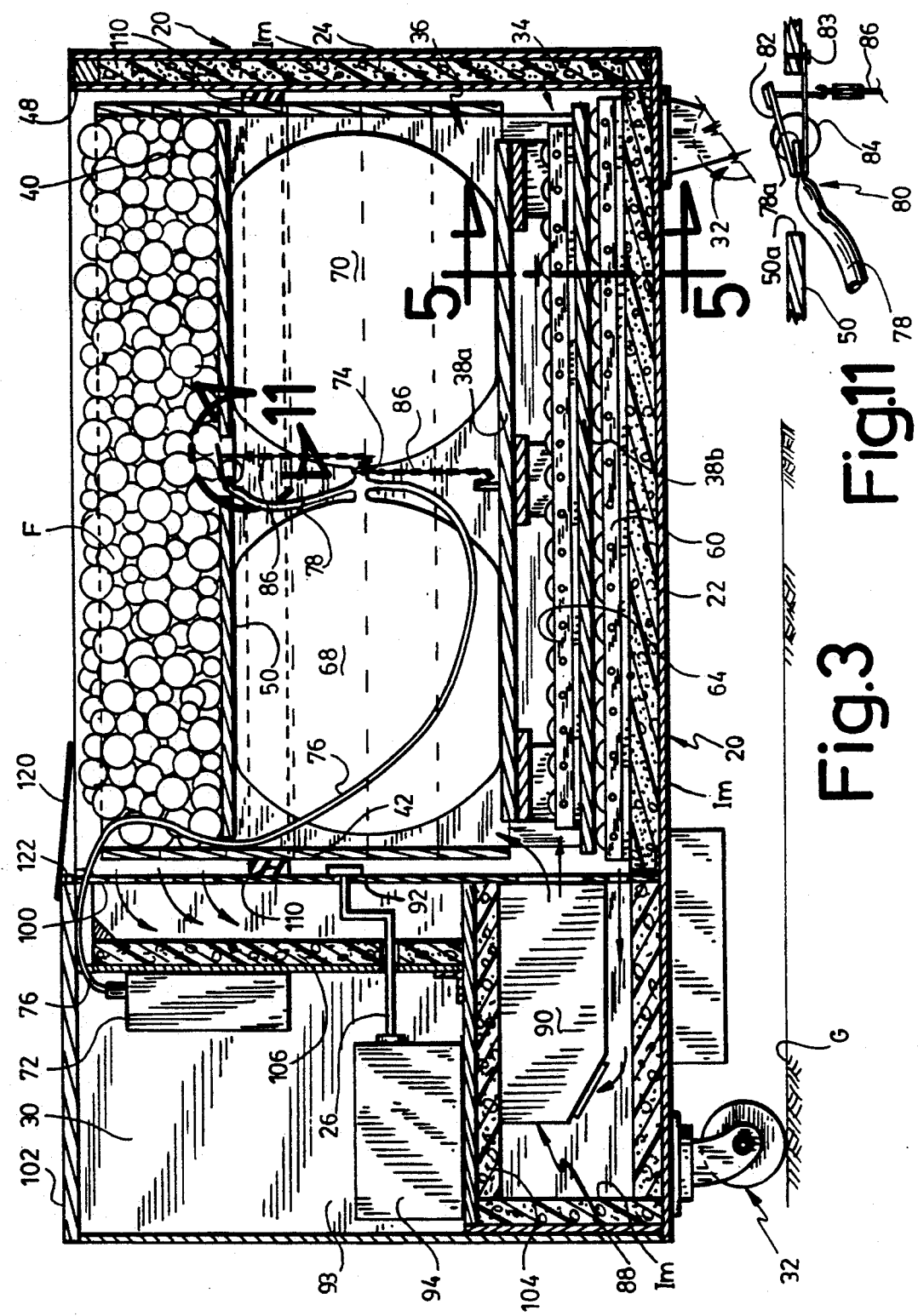
FIGS. 3 and 4 are sectional views taken along lines 3—3 of FIG. 2 and 4—4 of FIG. 1, respectively, FIG. 3 being at an enlarged scale and further suggesting how the inflatable balloon can raise the fruit supporting platform.

A second such preferred triggering means, illustrated as 120 in FIG. 3, would consist of a lever, hingedly depending from cover 102 and projecting over platform 50. As the fruit load supported by platform 50 rises with inflation of balloons 68, 70, the top layer of fruits F eventually tilt upwardly the downwardly-inwardly-inclined lever 120, up to a point where a micro-switch 122 is deactivated thereby sending a signal to the air compressor to interrupt air feed to the balloons 68, 70. As the fruit load over platform 50 is progressively depleted by the consumers picking up the fruits, the top layer of fruits F moves downwardly away from the lever 120, thus inducing the latter to returns to its natural, downwardly inclined state, whereby the micro-switch 122 will be reactivated to incrementally lift platform 50 by still further partially inflating balloons 68, 70.

Triggering means 120, 122, therefore constitutes an automatic control means, which is desirable since it further reduces labour charges to the storekeeper owner.

Balloons 68, 70, should be made from a resilient, stretchable material of any known type in the art.

Each conveyor member 60–66 have been illustrated as a plurality of short cylinders rotatably carried around short parallel axles, the latter pivotally mounted to a pair of opposite rigid rails. Of course, any other construction of conveyor would be well within the scope of the present invention. It is understood that, each time a fruit box 36 is unloaded from compartment 34 of display cabinet 20, rollingly over conveyors 60–66, door 24 is opened and air feed hose 76 has to be manually disconnected by the store clerk, or connected during box loading when door 24 is open.

Fruit box 36 is of the conventional make. For the collecting and storing of apples picked up from apple trees by orchardists and their apple picker employees, the trade name of the fruit box is "tote box" in the U.S., "bin" or "benne" (French Canadian) in Canada, and "PALOX" in France. The overall dimensions of such a tote box is usually the following: (in inches): $42 \times 48 \times 30$ (H) - i.e. in centimeters: $106.7 \times 121.9 \times 76.2$. Such a tote box is capable of loading up to about 20 bushels of apples, i.e. about fourty pounds of fruits (18.2 kg) [one bushel $\approx 36$ liters ]. The walls of the tote box is made of nailed wooden planks, with the successive pairs of planks being spaced apart from one another to allow free airflow therethrough and thus, enabling air recycling within the apple-containing enclosure of the box.

I claim:

1. A foodstuff-displaying refrigerator unit for use in a grocery store, comprising in combination:
   (a) a container, having a peripheral side wall member and a bottom flooring, whereby an enclosure is defined, said enclosure upwardly opening through a top mouth;
   (b) a platform, freely engaged into said enclosure for vertical movement therethrough along said side wall member, said platform defining an overlying loading volume for supporting and circumscribing perishable foodstuff goods in vertically stacked layers;
   (c) means for power lifting said platform from a lower limit position, proximate said flooring, to an upper limit position, proximate said mouth, said lifting means including an inflatable balloon member, directly engaging the underface of said platform and supported by said flooring, air feed means, for feeding pressurized air into said balloon member for inflating the latter, and control means, for actuating said air feed means upon the volume of said foodstuff goods in said platform loading volume reaching a set threshold level; and
   (d) cooling means, for continuously cooling the air within said foodstuff loading volume;
   wherein the level of top layer of said foodstuff goods within said loading volume is adjusted by said control means to remain substantially about the plane of said top mouth of refrigerator enclosure, upon progressive depletion of foodstuff goods due to the picking up of the foodstuff goods by the grocery store customers, so as to maintain ease of inspection of and of access to the foodstuff by the customer.

2. A refrigerator unit as defined in claim 1, wherein said container flooring is carried over ground by idle casters, so that said container be freely movable over ground.

3. A refrigerator unit as defined in claim 1, wherein said platform and balloon member form an integral part of the main frame defined by a foodstuff-enclosing box, said box further including a bottom pallet member to be mounted between said flooring and said balloon member, said container side wall member defining an access opening closable by a door, said box freely engageable into said container enclosure through said access opening.

4. A refrigerator unit as defined in claim 3, further including a first elongated conveyor member, fixedly anchored to said flooring beneath said pallet, and a second elongated conveyor member, releasably endwisely engageable to said first elongated conveyor member to constitute an inclined boxloading ramp extending outwardly from said container through said access door to ground level, said first and second conveyor members facilitating box loading by providing load rolling motion through said access opening.

5. A refrigerator unit as defined in claim 1, further including overpressure relief means, cooperating with said air feed means to prevent air pressure within said balloon member from exceeding a threshold level, and therefore preventing said platform from exceeding an upper limit position.

6. A refrigerator unit as defined in claim 3, wherein said container side wall member and flooring are provided with thermal insulation, but not said platform, said cooling means diffusing cool air through said pallet member, whereby cool air generated by said cooling means will leak through said platform and disperse through said foodstuff goods starting with the lower layers thereof.

7. A refrigerator unit as defined in claim 1, wherein said control means includes a pivotable lever, hingedly carried to said container side wall member and having a main free end portion overhanging said platform inside said enclosure, said pivotable lever free end portion tiltingly responsive to a variation in height of said foodstuff within said platform loading area, and a microswitch means, said microswitch means operatively connected to said air feed means and actuating the latter upon said pivotable lever tilting downwardly beyond a threshold value corresponding to a partially depleted volume of foodstuff goods within said platform loading volume.

* * * * *